(12) United States Patent
Tanabe

(10) Patent No.: US 7,603,216 B2
(45) Date of Patent: Oct. 13, 2009

(54) COLLISION DETERMINATION APPARATUS FOR VEHICLE

(75) Inventor: Takatoshi Tanabe, Ichinomiya (JP)

(73) Assignee: Denso Corporation, Kariya (JP)

( * ) Notice: Subject to any disclaimer, the term of this patent is extended or adjusted under 35 U.S.C. 154(b) by 612 days.

(21) Appl. No.: 11/542,770

(22) Filed: Oct. 4, 2006

(65) Prior Publication Data

US 2007/0083310 A1  Apr. 12, 2007

(30) Foreign Application Priority Data

Oct. 11, 2005 (JP) ............................. 2005-296369

(51) Int. Cl.
*B60R 21/00* (2006.01)
(52) U.S. Cl. ........................................ 701/45; 340/436
(58) Field of Classification Search .................. None
See application file for complete search history.

(56) References Cited

U.S. PATENT DOCUMENTS 6,784,792 B2   8/2004 Mattes et al.

2004/0210367 A1*  10/2004 Takafuji et al. ............... 701/45
2006/0185922 A1   8/2006 Tanabe

FOREIGN PATENT DOCUMENTS

DE  10 2005 017 992   10/2006
JP       05-038998    2/1993
JP       2002-005228  1/2002

OTHER PUBLICATIONS

Office Action dated Apr. 30, 2007 in German Application No. 10 2006 046 135.5 with English translation.

* cited by examiner

*Primary Examiner*—Michael J. Zanelli
(74) *Attorney, Agent, or Firm*—Harness, Dickey & Pierce, PLC

(57) ABSTRACT

A collision determination apparatus has a detection unit and a determination unit. The detection unit is disposed to a connecting portion that connects a panel member to a body of a vehicle. The detection unit detects a collision load applied to the panel member due to a collision and transmitted to the connecting portion in a direction parallel to a ground, and outputs a detection signal to the determination unit. The determination unit determines the collision. The panel member is for example a hood or a front fender of the vehicle.

9 Claims, 3 Drawing Sheets

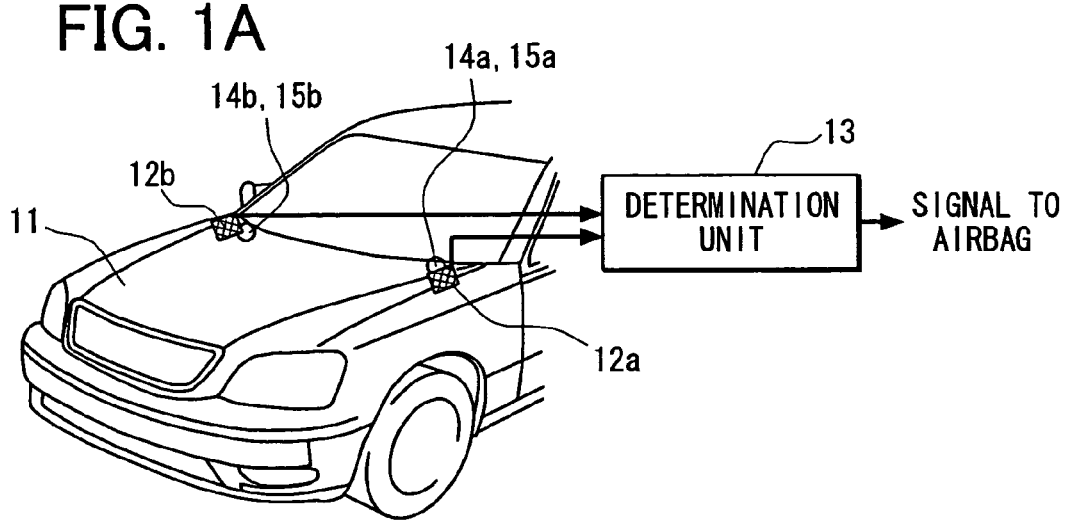
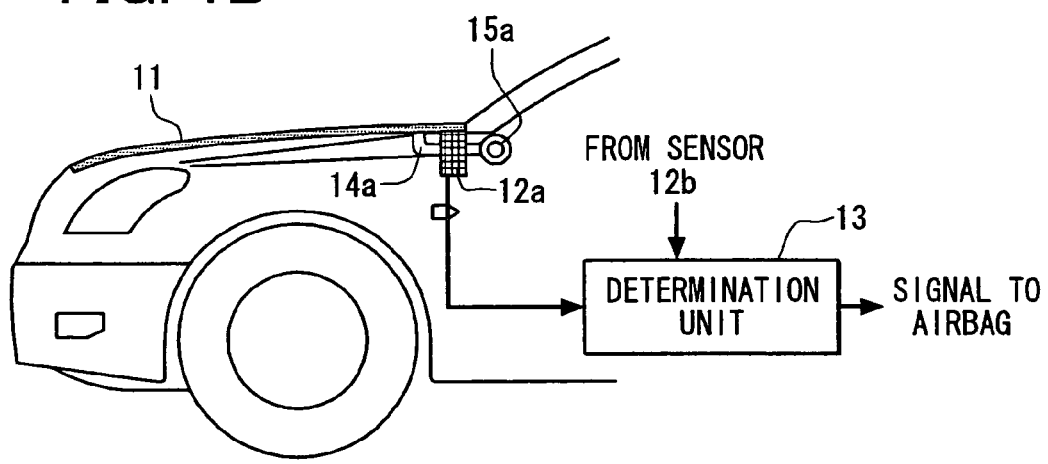
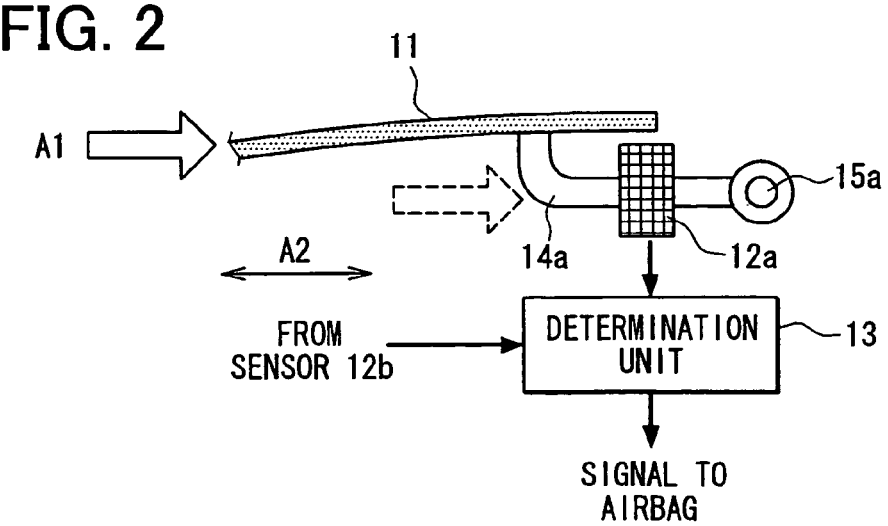

COLLISION DETERMINATION APPARATUS FOR VEHICLE

CROSS REFERENCE TO RELATED APPLICATION

This application is based on Japanese Patent Application No. 2005-296369 filed on Oct. 11, 2005, the disclosure of which is incorporated herein by reference.

FIELD OF THE INVENTION

The present invention relates to a collision determination apparatus mounted to a vehicle, for example, used for determining whether an object collided with the vehicle is a human (e.g., pedestrian) for operating a pedestrian protection device such as an air bag.

BACKGROUND OF THE INVENTION

It has been proposed to mount an air bag system as a pedestrian protection device on a vehicle for protecting a human (e.g., a pedestrian) collided with the vehicle. Such an air bag system expands an air bag at a time when the vehicle collides with a pedestrian so as to protect the head and chest of the pedestrian from colliding with a windshield of the vehicle and A-pillars located at sides of the windshield. To expand the air bag, it is necessary to immediately determine whether an object collided with the vehicle is a human (e.g., pedestrian) or an obstacle that does not need the expansion of the air bag.

For example, Japanese Publication No. 2003-535769 (U.S. Pat. No. 6,784,792 B2) discloses an apparatus for recognizing an object collided with a vehicle. The apparatus has a first sensor mounted at a middle portion of a front side of a hood and a second sensor along to a bumper cover. The first sensor detects a load applied to the middle portion of the front end of the hood. The second sensor detects a load applied to the bumper cover. The apparatus determines whether or not an object collided with the vehicle is a pedestrian by comparing the loads detected by the first and second sensors.

However, since the first sensor is arranged at the middle portion of the front side of the hood, it may be difficult to accurately detect a collision load applied to a right end and a left end of the hood. To solve this problem, it can be considered to arrange the sensor thoroughly along the front end of the hood, i.e., from a front right end to a front left end of the hood. In this case, however, the size of the sensor increases.

SUMMARY OF THE INVENTION

The present invention is made in view of the foregoing matter, and it is an object of the present invention to provide a vehicular collision determination apparatus having a sensor as a detection unit that is reduced in size by arranging at a position to which a collision load is transmitted in a concentrated manner.

According to an aspect of the present invention, a collision determination apparatus is mounted to a vehicle having a panel member defining an outer wall of the vehicle and a connecting portion that connects the panel member to a body of the vehicle. The collision determination apparatus has a detection unit and a determining unit. The detection unit is arranged to detect a collision load caused by a collision and transmitted to the connecting portion of the vehicle in a direction substantially parallel to a ground. The determination unit receives a detection signal outputted from the detection unit and determines the collision.

For example, the panel member is a hood of the vehicle, and the detection unit is arranged to the connecting portion that connects the hood to the body of the vehicle. The determination unit for example determines whether the collision object is a pedestrian or not based on the signal outputted from the detection unit.

In a case that a pedestrian collides with a front end of the vehicle, the pedestrian will fall over the vehicle. Thus, it is preferable to detect a collision load applied to the hood that is located above a bumper. The collision load applied to the hood is transmitted to the connecting portion, which connects the hood to the body of the vehicle, in a concentrated manner. As such, the detection unit is disposed at the connecting portion to which the collision load is transmitted in the concentrated manner. Therefore, the size of the detection unit reduces.

Further, the panel member can be a fender, for example. In a case that a pedestrian collides with a front side portion of the vehicle, a collision load is transmitted to the connecting portion that connects the fender to the body of the vehicle in a concentrated manner. Thus, the detection unit can be disposed at the connecting portion between the fender and the body of the vehicle, to which the collision load is transmitted in the concentrated manner. Therefore, the size of the detection unit reduces.

BRIEF DESCRIPTION OF THE DRAWINGS

Other objects, features and advantages of the present invention will become more apparent from the following detailed description made with reference to the accompanying drawings, in which like parts are designated by like reference numbers and in which:

FIG. 1A is a schematic perspective view of a vehicle for showing general arrangements of compositions of a collision determination apparatus according to a first embodiment of the present invention;

FIG. 1B is a schematic side view of the vehicle with the collision determination apparatus shown in FIG. 1A, when viewed from a left side, according to the first embodiment;

FIG. 2 is an explanatory view of a left collision load detecting sensor and related components of the collision determination apparatus according to the first embodiment;

DETAILED DESCRIPTION OF EXAMPLE EMBODIMENTS

First Embodiment

Figure 3A:
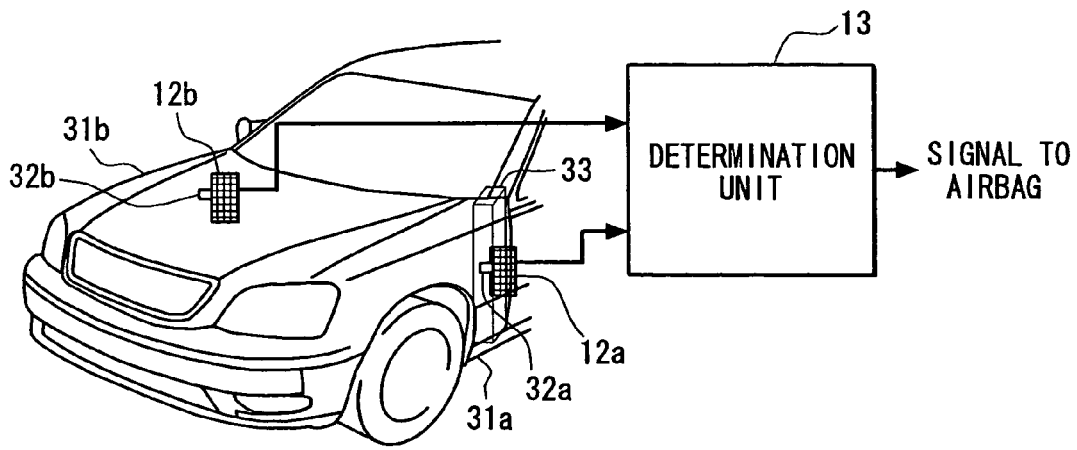
FIG. 3A is a schematic perspective view of a vehicle for showing general arrangements of components of a collision determination apparatus according to a second embodiment of the present invention.

A first embodiment of a collision determination apparatus of the present invention will be described with reference to FIGS. 1A, 1B and 2. The collision determination apparatus is mounted to a vehicle and for example used for determining whether an object collided with the vehicle is a human (e.g., pedestrian) for operating a pedestrian protection apparatus, as shown in FIGS. 1A and 1B. The vehicle is provided with a hood (bonnet) 11, a left link portion 15a, a right link portion 15b, a left hinge portion 14a, and a right hinge portion 14b.

The left link portion 15a and the right link portion 15b are provided on a body (frame) of the vehicle at positions corresponding to a left end and a right end of a rear end of the hood 11, respectively, the rear end being located adjacent to an upper end of a dashboard and a lower end of a windshield of the vehicle. The left hinge portion 14a and the right hinge portion 14b are disposed to couple the hood 11 to the left link portion 15a and the right link portion 15b, respectively.

The hood 11 is supported movable between an open position at which an engine compartment is open and a closed position at which the engine compartment is closed about the left hinge portion 14a and the right hinge portion 14b as a rotation axis. Thus, the left hinge portion 14a and the right hinge portion 14b serve as support members for supporting the hood 11 and as connecting portions to connect the hood 11 to the frame of the vehicle.

A left load detecting sensor (hereafter, left sensor) 12a is mounted to the left hinge portion 14a to detect a load applied to the left hinge portion 14a. Also, a right load detecting sensor (hereafter, right sensor) 12b is mounted to the right hinge portion 14b to detect a load applied to the right hinge portion 14b. The left sensor 12a and the right sensor 12b output detected loads to a determination unit 13 as detection signals, respectively.

The determination unit 13 is for example composed of a microcomputer mounted inside of the vehicle. The determination unit 13 determines whether an object collided with the vehicle is a pedestrian or not. When it is determined that the collision object is a pedestrian, the determination unit 13 outputs a signal to trigger a pedestrian protection apparatus such as an airbag for protecting the pedestrian.

Next, structures and arrangement of the fore-mentioned components will be described with reference to FIG. 2. As shown in FIG. 2, the hood 11 extends substantially parallel to a ground. Also, the left hinge portion 14a is arranged substantially parallel to the ground. The left hinge portion 14a connects the hood 11 to the frame of the vehicle as the connecting portion.

Specifically, the left hinge portion 14a connects the hood 11 and the left link portion 15a at a position adjacent to the rear end of the hood 11. The left link portion 15a is supported by a bulkhead that forms the frame of the vehicle. The left sensor 12a is arranged on the left hinge portion 14a. The left sensor 12a is constructed of a load cell that can be mounted to the left hinge potion 14a, for example.

In this case, the left sensor 12a detects a load (A1) exerted to the hood 11 in a direction parallel to the ground based on the amount of strain (distortion) of the left hinge portion 14a. In FIG. 2, an arrow A1 denotes a collision load caused by a collision, and an arrow A2 denotes a load detecting direction.

The right link portion 15b and the right hinge portion 14b are arranged at a position adjacent to a right portion of the rear end of the hood 11 and constructed in a manner similar to that of the left link portion 15a and the left hinge portion 14a.

Incidentally, if one of the left link portion 15a, the right link portion 15b, the left hinge portion 14a and the right hinge portion 14b is broken when the front end of the vehicle has a collision, the hood 11 would stick into or be pushed into the passenger compartment. To restrict this, the left link portion 15a, the right link portion 15b, the left hinge portion 14a and the right hinge portion 14b are constructed to have sufficient strength.

Although the left hinge portion 14a and the right hinge portion 14b have sufficient strength, the bulkhead supporting the left link portion 15a and the right link portion 15b is stronger than the left hinge potion 14a and the right hinge portion 14b.

In this construction, the collision load A1 applied to the hood 11 is transmitted to the left hinge portion 14a and the right hinge portion 14b in a concentrated manner, and received by the frame (bulkhead) of the vehicle having sufficient strength. The left sensor 12a and the right sensor 12b respectively detect deformation of the left hinge portion 14a and deformation of the right hinge portion 14b to which the collision load is transmitted in the concentrated manner, as the collision load.

Accordingly, since the left sensor 12a and the right sensor 12b respectively detect the deformation of the left hinge portion 14a and deformation of the right hinge portion 14b to which the collision load is concentrated, a collision load applied to a wide or large panel member, such as the hood 11 can be detected. Therefore, even if the collision load is partly applied such as to the left end or the right end of a front side of the hood 11, it can be detected at the left hinge portion 14a and the right hinge portion 14b.

The collision load caused in a wide detection area can be detected without widely or largely arranging a load detecting sensor. Further, it can be determined whether the collision object is a pedestrian or not. Namely, by arranging the sensors 12a, 12b at the connecting portions, a size-reduced sensor arranging structure can be provided. Also, it is less likely that this sensor arrangements will influence on an external appearance of the vehicle.

Second Embodiment

Figure 3B:
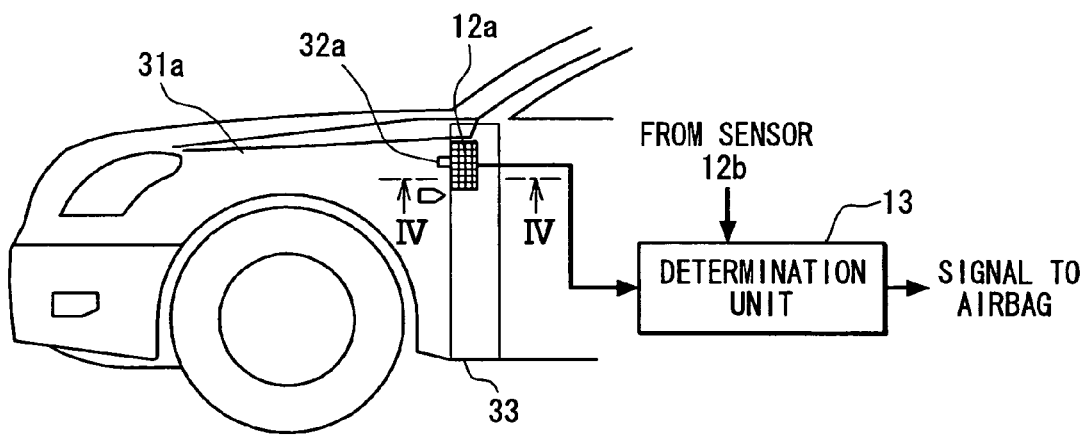
FIG. 3B is a schematic side view of the vehicle with the collision determination apparatus shown in FIG. 3A, when viewed from a left side, according to the second embodiment.

Next, a second embodiment of the present invention will be described with reference to FIGS. 3A, 3B and 4. In the second embodiment, the arrangement positions of the left sensor 12a and the right sensor 12b are different from those of the first embodiment. As shown in FIGS. 3A and 3B, the left sensor 12a is arranged at a connecting portion between a left front fender 31a and the body of the vehicle, and the right sensor 12b is arranged at a connecting portion between a right front fender 31b and the body of the vehicle. Here, like components are denoted by like reference characters and a description thereof is not repeated.

The vehicle is provided with the left front fender 31a, a left front pillar 33 and a left load transmission part 32a coupling the left front fender 31a and the left front pillar 33 as the connecting portion. The left sensor 12a is arranged at the left load transmission part 32a. The vehicle is also provided with the right front fender 31b, a right front pillar and a right load transmission part 32b coupling the right front fender 31b and the right front pillar as the connecting portion. The right sensor 12b is arranged at the right load transmission part 32b. The determination unit 13 is arranged inside the vehicle, similar to the first embodiment.

Figure 4:
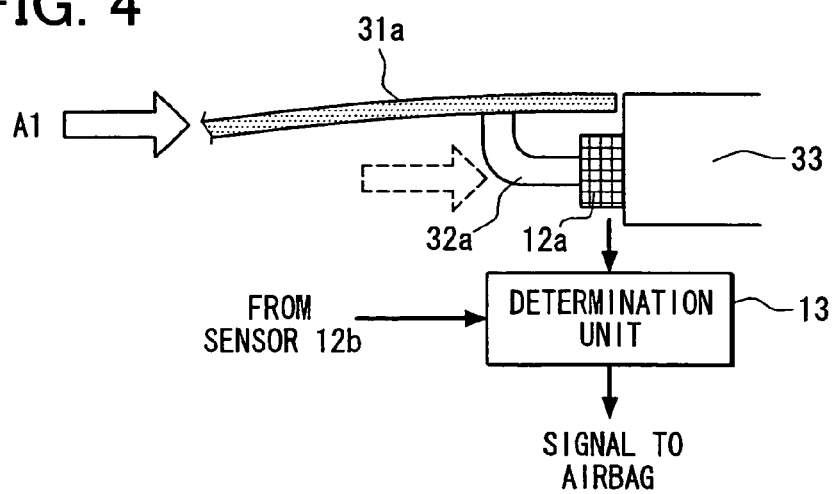
FIG. 4 is a schematic sectional view of a left front fender taken along a line IV-IV in FIG. 3B.

As shown in FIG. 4, the left sensor 12a, which is arranged at the left load transmission part 32a, detects the collision load A1 applied to the left front fender 31a from a front side based on the amount of distortion of the left load transmission part 32a. The left sensor 12a is for example constructed of a load cell. Likewise, the right sensor 12b is for example constructed of a load cell. Also, the right sensor 12b and the right load transmission part 32b are constructed in a manner similar to that of the left sensor 12a and the left transmission part 32a.

The left front pillar 33 and the right front pillar are provided as the frame of the vehicle. The left front pillar 33 and the right front pillar are individual parts. As such, it is less likely that the collision load applied to one of the front pillars will be transmitted to the other one of the front pillars. Therefore, the determination unit 13 easily determines on which side or in which direction the collision object collides.

In a case that airbags for protecting a pedestrian are provided separately on the left side and the right side of the vehicle, the airbag on the necessary side can be selectively expanded by determining the direction or position of the collision.

Also in this case, the left sensor 12a and the right sensor 12b are arranged at the load transmission parts 32a, 32b that connect the front fenders 31a, 31b to the frames of the vehicle. As such, advantageous effects similar to the first embodiment can be also provided.

Third Embodiment

Next, a third embodiment of the present invention will be described with reference to FIGS. 5A, 5B and 6. In the third embodiment, the load detectingسensor is arranged at a position different from those of the first and second embodiments. Here, like components are denoted by like reference characters and a description thereof is not repeated.

Figure 5A:
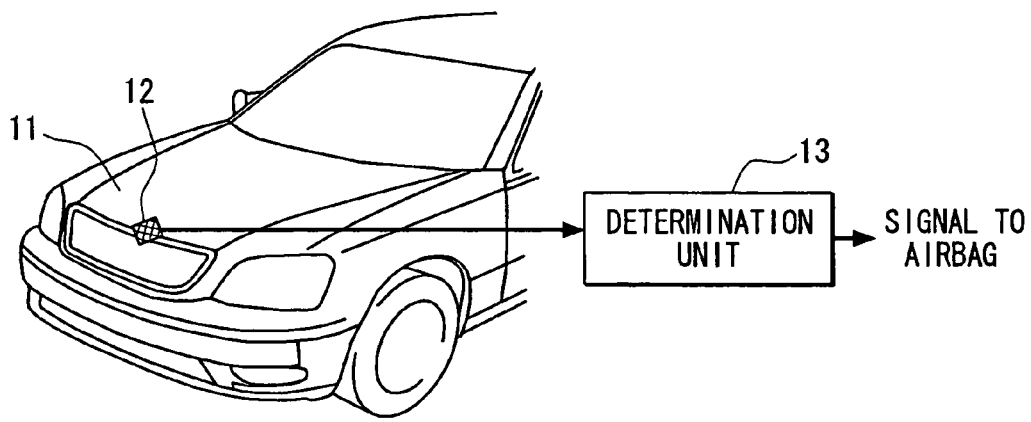
FIG. 5A is a schematic perspective view of a vehicle for showing general arrangements of components of a collision determination apparatus according to a third embodiment of the present invention.
Figure 5B:
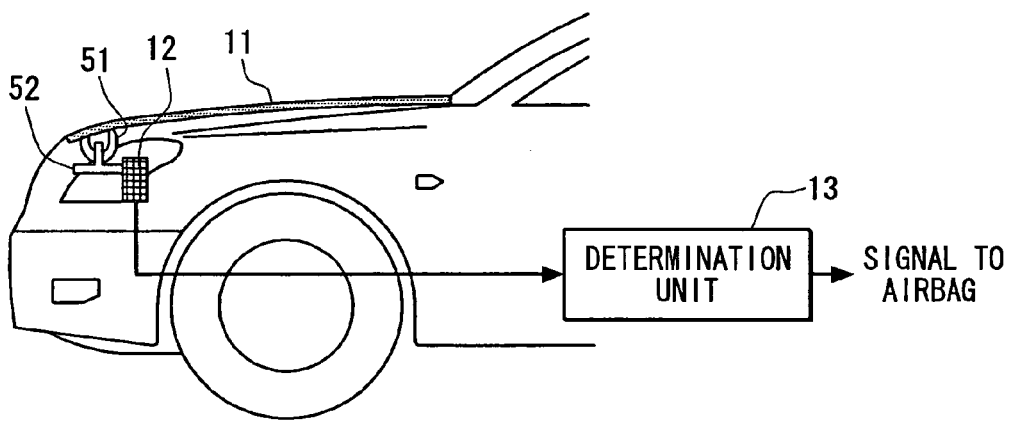
FIG. 5B is a schematic side view of the vehicle with the collision determination apparatus shown in FIG. 5A, when viewed from a left side, according to the third embodiment.

As shown in FIGS. 5A and 5B, a striker 52 for holding the hood 11 at the closed position is fixed to a radiator core support (not shown) that constructs the frame of the vehicle. A load detecting sensor (hereafter, sensor) 12 is mounted to the striker 52. When the hood 11 is at the closed position, the striker 52 couples with a hook 51 provided on an inside wall (bottom wall in FIG. 5B) of the hood 11. In this condition, the hook 51 is indirectly fixed to the frame of the vehicle through the striker 52.

Figure 6:
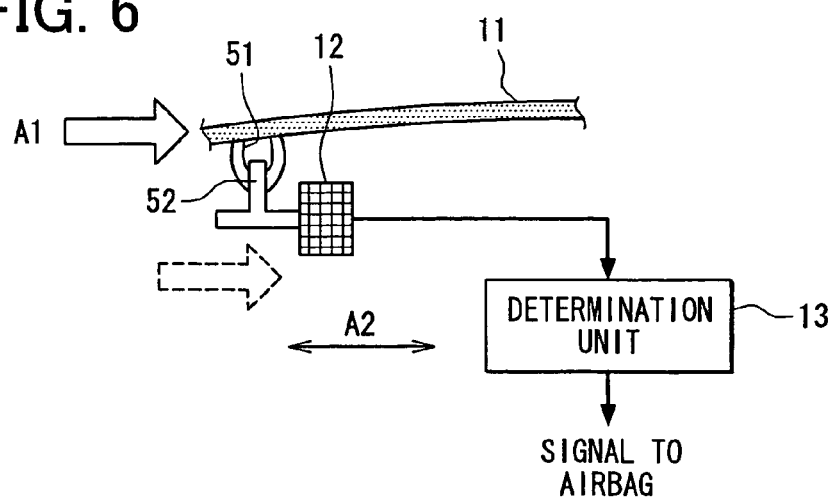
FIG. 6 is an explanatory view of a collision load detecting sensor and related components of the collision determination apparatus according to the third embodiment.

As shown in FIG. 6, the collision load (A1) applied to the hood 11 from the front side is transmitted to the striker 52 through the hook 51. As such, the sensor 12 detects the collision load. Accordingly, advantageous effects similar to those of the first embodiment can be provided.

In the third embodiment, the sensor 12 is arranged on the striker 52, i.e., on an engine side. Alternatively, the sensor 12 can be arranged on a side of hood 1. For example, the sensor 12 can be arranged to the hook 51. Also in this case, similar advantageous effects can be provided.

In the above embodiments, the load detecting sensors 12, 12a, 12b are arranged at the connecting portions that connect panel members such as the hood 11 and the front fenders 31a, 31b to the frame of the vehicle. The sensors 12, 12a, 12b detect the load transmitted to the connecting portions 14a, 14b, 32a, 32b, 51, 52 in a direction parallel to the ground. Thus, the collision caused in a part of the wide detection area can be detected by the sensors 12, 12a, 12b, which are partly arranged.

The above embodiments can be modified as follows.

In the above first and second embodiments, two load detecting sensors 12a, 12b are used to detect the collision load. However, the number of the sensors is not limited to two, but can be increased to improve detection accuracy. Further, the load detecting sensors can be arranged to some of or all of the connecting portions 14a, 14b, 32a, 32b, 51, 52.

Further, in the above embodiments, the determination unit 13 determines whether the collision object is a pedestrian or not to trigger the pedestrian protection apparatus such as the airbags for protecting pedestrian. However, it is not always necessary to use the detected results for the pedestrian protection apparatus, but can be used for another system such as an airbag system for protecting passengers.

In the above embodiments, the collision load (A1) from the front side is not limited to a collision load applied in the direction parallel to the ground, but includes a collision load applied diagonally to the direction parallel to the ground. Also, the collision load from the front side is not limited to a collision load applied in the direction parallel to a centerline passing through the vehicle from the front end to a rear end. For example, the collision load from the front side also includes a collision load applied in a direction diagonal to the centerline.

In the above embodiments, the sensors 12, 12a, 12b are disposed to the connecting portions 14a, 14b, 32a, 32b, 51, 52 to which the collision load is transmitted in the concentrated manner. However, the sensor can be disposed to a connecting portion that connects a panel member other than the hood 11 and the front fenders 31a, 31b to the body of the vehicle, to which the collision load is transmitted in the concentrated manner.

The exemplary embodiments of the present invention are described above. However, the present invention is not limited to the above exemplary embodiments, but may be implemented in other ways without departing from the spirit of the invention.

What is claimed is:

1. A collision determination apparatus for a vehicle that has a panel member defining an outer wall of the vehicle and a connecting portion that connects the panel member to a body of the vehicle, comprising:
    a detection unit disposed to the connecting portion, the detection unit detecting a collision load transmitted to the connecting portion in a direction parallel to a ground due to a collision of the vehicle with an object and outputting a detection signal; and
    a determination unit that receives the detection signal from the detection unit and determines the collision based on the detection signal.

2. The collision determination apparatus according to claim 1, wherein the panel member is a hood of the vehicle.

3. The collision determination apparatus according to claim 2, wherein the connecting portion is constructed of at least one of a support member, a striker and a hook member, the support member supporting the hood movable between a first position opening an engine compartment of the vehicle and a second position closing the engine compartment, the striker and the hook holding the hood at the second position.

4. The collision determination apparatus according to claim 3, wherein the support member is supported by a bulkhead of the vehicle through a link portion.

5. The collision determination apparatus according to claim 1, wherein the panel member is a front fender of the vehicle.

6. The collision determination apparatus according to claim 5, wherein the connecting portion is connected to a front pillar of the vehicle that forms a frame of the vehicle.

7. The collision determination apparatus according to claim 1, wherein the detection unit is composed of a load cell.

8. The collision determination apparatus according to claim 1, wherein the determination unit determines a sort of the object based on the detection signal.

9. The collision determination apparatus according to claim 1, wherein the determination unit determines whether the object is a pedestrian, and when it is determined that the object is the pedestrian, the determination unit outputs a signal to a pedestrian protection apparatus to trigger the pedestrian protection apparatus.

* * * * *

UNITED STATES PATENT AND TRADEMARK OFFICE
CERTIFICATE OF CORRECTION

PATENT NO.        : 7,603,216 B2                                      Page 1 of 1
APPLICATION NO.   : 11/542770
DATED             : October 13, 2009
INVENTOR(S)       : Takatoshi Tanabe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 621 days.

Signed and Sealed this

Fifth Day of October, 2010

David J. Kappos
*Director of the United States Patent and Trademark Office*